US010486907B2

(12) United States Patent
Metz et al.

(10) Patent No.: US 10,486,907 B2
(45) Date of Patent: Nov. 26, 2019

(54) TRANSPORTING SYSTEM FOR AN INSTALLATION, IN PARTICULAR A PRODUCTION, PACKAGING, FILLING, ASSEMBLY AND/OR PROCESSING INSTALLATION

(71) Applicant: Optima Consumer GmbH, Schwäbisch Hall (DE)

(72) Inventors: Mathias Metz, Traunstein (DE); Michael Moll, Schwäbisch Hall (DE)

(73) Assignee: OPTIMA consumer GmbH, Schwäbisch Hall (DE)

( * ) Notice: Subject to any disclaimer, the term of this patent is extended or adjusted under 35 U.S.C. 154(b) by 0 days.

(21) Appl. No.: 16/063,390

(22) PCT Filed: Dec. 7, 2016

(86) PCT No.: PCT/EP2016/080089
§ 371 (c)(1),
(2) Date: Jun. 18, 2018

(87) PCT Pub. No.: WO2017/102503
PCT Pub. Date: Jun. 22, 2017

(65) Prior Publication Data
US 2018/0370732 A1 Dec. 27, 2018

(30) Foreign Application Priority Data
Dec. 17, 2015 (DE) .................. 10 2015 225 834

(51) Int. Cl.
B65G 17/00 (2006.01)
B23Q 7/14 (2006.01)
B65G 19/02 (2006.01)
(52) U.S. Cl.
CPC ......... B65G 17/002 (2013.01); B23Q 7/1452 (2013.01); B65G 19/02 (2013.01)
(58) Field of Classification Search
CPC .... B65G 15/12; B65G 17/002; B65G 17/005; B65G 19/02
(Continued)

(56) References Cited

U.S. PATENT DOCUMENTS 4,256,221 A 3/1981 Lain
4,941,563 A 7/1990 Fahrion
(Continued)

FOREIGN PATENT DOCUMENTS

DE 10 35 566 B 7/1958
DE 10360082 A1 7/2005
(Continued)

OTHER PUBLICATIONS

International Search Report dated Jan. 12, 2017 in connection with PCT/EP2016/075029.
(Continued)

Primary Examiner — James R Bidwell
(74) Attorney, Agent, or Firm — Akerman LLP

(57) ABSTRACT

A transportation system for production, packaging, filling, assembly and/or processing installation, comprising a carrier system having a conveying section and having a multiplicity of carrier elements, a first drive device, wherein the carrier elements have in each case one coupling mechanism by which the carrier elements are capable of being coupled to the first drive device for a movement along the conveying section, at least one second drive device, wherein the carrier elements can be coupled to the at least one second drive device by the coupling mechanism for a movement along the conveying section, and at least one switching mechanism that is positioned on the conveying section, wherein the coupling mechanisms of the carrier elements are capable of being coupled selectively to one of the drive devices by the at least one switching mechanism for a movement along the conveying section.

10 Claims, 2 Drawing Sheets

(58) Field of Classification Search
USPC .................. 198/817, 803.2, 867.14, 465.3
See application file for complete search history.

(56) References Cited

U.S. PATENT DOCUMENTS

| | | | |
|---|---|---|---|
| 6,691,856 B1 * | 2/2004 | Prakken | B65G 17/26 198/419.3 |
| 6,866,140 B2 | 3/2005 | Iwasa | |
| 6,997,304 B2 * | 2/2006 | Thomas | B65G 17/002 198/465.3 |
| 7,637,367 B1 * | 12/2009 | Cannell | B65G 17/002 198/465.3 |
| 2008/0251352 A1 | 10/2008 | Noll | |

FOREIGN PATENT DOCUMENTS

| | | | |
|---|---|---|---|
| DE | 102004044846 A1 | 3/2006 | |
| DE | 102011014981 A1 | 9/2012 | |
| WO | 88/02345 * | 4/1988 | ............. B65G 35/06 |

OTHER PUBLICATIONS

European Search Report issued in connection with EP 10 2015 221 646.2.

* cited by examiner

TRANSPORTING SYSTEM FOR AN INSTALLATION, IN PARTICULAR A PRODUCTION, PACKAGING, FILLING, ASSEMBLY AND/OR PROCESSING INSTALLATION

This application is a national phase of PCT/EP2016/080089, filed Dec. 7, 2016, and claims priority to DE 10 2015 225 834.3, filed Dec. 17, 2015, the entire contents of which are hereby incorporated by reference.

TECHNICAL FIELD AND PRIOR ART

The invention relates to a transportation system for an installation, in particular a production, packaging, filling, assembly and/or processing installation. The invention furthermore relates to an installation, in particular a production, packaging, filling, assembly and/or processing installation having a transportation system. The invention furthermore relates to a method for transporting carrier elements in an installation, in particular a production, packaging, filling, assembly and/or processing installation.

Containers, container pallets, workpieces and/or work piece carriers are conveyed in a production, packaging, filling, assembly and/or processing installation along a conveying section to various stations and in the latter are subjected to a treatment. For example, containers are molded, filled, closed, and repackaged in various stations in a filling installation.

A modular installation for filling product to be filled into individual containers is known, for example, from DE 10 2004 044 846 A1. The installation comprises a transportation system which is capable of being operated selectively in an intermittent operation or a continuous operation across the entire conveying section. In the case of an intermittent operation, a processing cycle is identical for all stations and is established in a centralized manner. In the case of a continuous operation, all stations are passed through at the same speed. A continuous transportation or an intermittent transportation of the containers is advantageous depending on the processing step. For example, an intermittent operation is advantageous when molding or inserting a cup, so as to avoid a conjoint movement of the tools. By contrast, filling of liquids is preferably performed in a continuous operation so as to prevent spilling of the liquids filled. Therefore, it is known for a plurality of conveying sections that are sequentially disposed in series to be provided, such that the individual stations are in each case passed by way of a suitable operating mode. Containers, container pallets, workpieces and/or work piece carriers herein have to be relocated from one conveying section to another conveying section.

OBJECT AND ACHIEVEMENT

It is an object to provide a transportation system for a production, packaging, filling, assembly and/or processing installation, which enables the individual stations to be passed by way of a respective suitable operating mode without changing the conveying section. Further objects are to provide a respective installation and a method for transporting carrier elements.

According to a first aspect, in transportation system for an installation, in particular a production, packaging, filling, assembly and/or processing installation, comprising a carrier system having a conveying section and having a multiplicity of carrier elements and a first drive device, wherein the carrier elements have in each case one coupling mechanism by means of which the carrier elements for a movement along the conveying section are capable of being coupled to the first drive device, at least one second drive device and at least one switching mechanism that is positioned on the conveying section are provided, wherein the carrier elements by means of the coupling mechanism for a movement along the conveying section are capable of being coupled to the at least one second drive device, and wherein by means of the at least one switching mechanism the coupling mechanisms of the carrier elements for a movement along the conveying section are capable of being selectively coupled to one of the drive devices.

An installation having a conveying section that is capable of being defined upfront can thus be achieved, wherein the carrier elements, without departing from the conveying section, are movable along the conveying section by means of different drive devices.

The carrier elements, depending on the requirements of the installation, are capable of being designed in a suitable manner by a person skilled in the art. Said carrier elements serve for receiving one or a plurality of elements or items. For instance, the carrier elements for a transportation system of a filling installation are designed in a suitable manner so as to receive cups in a manner to be molded, or so as to receive already molded containers, wherein the containers are filled, sealed, and repackaged along the conveying section.

The carrier elements by means of the coupling mechanism are capable of being selectively coupled to one of the drive devices for a transmission of movement. The coupling mechanism for this purpose comprises suitable elements and is designed in a suitable manner depending on the requirements. A mechanical coupling is provided in one design embodiment. A magnetic, electromechanical and/or an electromagnetic coupling is provided in other design embodiments.

According to the invention, at least two drive devices are provided for the movement of the carrier elements along the conveying section. A change of the drive devices is possible by means of at least one switching mechanism that is positioned on the conveying section. An adaptation of the installation to various requirements is thus possible by adapting the position of the switching mechanism and the number thereof.

The number and the length of the drive devices to which the carrier elements are capable of being coupled is selectable in a suitable manner depending on the requirement of the installation. The drive devices are disposed in series in one design embodiment.

It is provided in advantageous design embodiments that the first drive device extends at least across one first portion of the conveying section, and the second drive device extends at least across one second portion of the conveying section, wherein the first portion and the second portion are mutually overlapping. In other words, the drive devices in advantageous design embodiments extend in parallel at least in portions, such that, depending on requirements of the installation, a movement across one portion of the conveying section is possible selectively by means of the first or of the second drive device. On account thereof, a system with high flexibility, which in the case of any change in the requirements is modifiable in the fast and simple manner is achieved. In one design embodiment, the first drive device extends across the entire conveying section, that is to say that a movement of the carrier elements by means of the first drive devices possible in each portion of the conveying section. By contrast, the second drive device in one design embodiment extends only across one portion of the conveying section in which an operating mode that is different from that predefined by the first drive device is desired or required. In other design embodiments, the first and the second drive device extend across the entire conveying section.

The first and the at least one second drive device are capable of being operated by way of dissimilar operating modes selected from the group comprising continuous transportation, single-index transportation, double-index transportation, multiple-index transportation. Single-index transportation, double-index transportation, and multiple-index transportation in the context of the application refer to an intermittent transportation, wherein an advancement of the transporting items, that is to say presently the transportation carriers, in one machine cycle is performed in a singularized manner, as a pair, or as a group, respectively.

In one design embodiment the drive devices are in each case capable of being operated at a non-variable speed, wherein the conception of the drive device is performed once and in a mutually tuned manner.

In advantageous design embodiments first and the at least one second drive device are in each case capable of being operated at a variable conveying speed that is capable of being established so as to be specific to the application. The the first and the at least one second drive device herein are preferably capable of being operated in an electronically and/or mechanically synchronized manner. On account thereof it is possible for the conveying speed of the installation to be varied, wherein the drive devices at each conveying speed remain so as to be mutually tuned such that bottlenecks or other irregularities in the conveying stream are avoided. The synchronization of the drive devices herein is possible in such a manner that, depending on requirements, gaps between carrier elements are closed or generated when changing the drive devices, or a change is performed without gaps being generated or closed, with the exception of a transfer region. For a synchronization it is provided in one design embodiment that the first and the at least one second drive device are capable of being operated at an identical average conveying speed that is capable of being established in a centralized manner. For this purpose, a common drive motor for both drive devices is provided in one design embodiment. Two synchronized drive motors are provided in other design embodiments. Synchronizing is performed, for example, by means of a central control installation or by way of a master/slave operation of the drive motors. In yet other design embodiments, the conveying speeds vary, wherein transportation across a defined portion of the conveying section is performed at a higher speed by means of the second drive installation than by means of the first drive installation, for example.

The drive devices are capable of being designed in a suitable manner, depending on requirements, by a person skilled in the art. In advantageous design embodiments the first and the at least one second drive device are designed as a gear rack drive, chain drive, belt drive, rake drive, warm drive, and/or linear motor drive. In one design embodiment herein, a first drive device and a second drive device of dissimilar construction mode are provided. For example, a chain is provided for a continuous drive, whereas a drive by means of linear motors that are assigned to the carrier elements is performed for an individual drive of the carrier elements in one portion of the conveying section. To this end, the coupling mechanism is designed in such a manner, for example, that mechanical coupling to the chain and decoupling from the chain, and an activation and deactivation of the linear motors, are possible by means of the switching mechanism.

In advantageous design embodiments the first and the at least one second drive device are of an identical construction mode. On account thereof, the complexity of the transportation system can be minimized.

The coupling mechanism is capable of being designed in a suitable manner by a person skilled in the art so as to be adapted to the choice of the drive devices.

It is provided in one design embodiment that the carrier elements function as a coupling mechanism and/or have in each case one coupling mechanism that is rigidly disposed on the carrier element, wherein the carrier elements by means of the switching mechanism are relocatable transversely to the conveying section in order for the drive device to be changed. The carrier elements have at least one downwardly protruding peg, for example, which depending on the transverse offset of the carrier elements in relation to a centerline of the conveying section interacts with the first or the second drive device.

In one design embodiment a mechanical or electromechanical coupling mechanism comprising at least one adjustable coupling block is provided, wherein the at least one coupling block by means of the switching mechanism is adjustable and, on account thereof, for a movement along the conveying section is capable of being coupled to one of the drive devices or is capable of being decoupled from the latter. The coupling block in one design embodiment has a pin which is insertable into a clearance on the drive device. The coupling block in other design embodiments has a clearance into which a pin that is provided on the drive device is insertable. At least one coupling block for each drive device is provided herein in one design embodiment. In advantageous design embodiments one coupling block which by way of an adjustment movement is capable of being selectively coupled to one of the drive devices is provided. The drive devices in one design embodiment have in each case two or more drivetrains, wherein separate coupling elements are provided for each drivetrain.

The switching mechanism in advantageous design embodiments for an adjustment movement of the carrier element, or of the coupling block, or of the coupling blocks, respectively, has at least one baffle that is disposed on the conveying section, wherein the carrier element or the coupling block by means of the baffle is adjustable, in particular displaceable, from a first position in which said carrier element or said coupling block interacts with the first drive device to a second position in which said carrier element or coupling block interacts with the second drive device. A simple mechanical solution that is prone to few breakdowns is achieved on account thereof.

In order for simultaneous driving by means of a plurality of drive devices and resulting forces that act on the carrier element in opposing directions to be avoided, a transition region is provided in one design embodiment, wherein the carrier elements during a change of the drive devices in the transition region do not interact with any drive device, and the carrier elements by means of successive carrier elements being movable in a passive manner along the conveying section.

According to a second aspect an installation, in particular a production, packaging, filling, assembly and/or processing installation, comprising a transportation system according to the invention is achieved. The installation in one design embodiment is designed as a filling installation comprising a container feeding unit, a container cleaning unit, a container filling unit, a weighing station, a feed of container closures, a closing station, and a control system. In other design embodiments, other stations, additional stations or fewer stations are provided. The products to be filled, depending on the design embodiment, are powders, pastes, liquids, in particular foodstuffs, drinks and tobacco products, cleaning agents, cosmetic products, or pharmaceutical products.

According to a further aspect, a method for transporting carrier elements in an installation, in particular a production, packaging, filling, assembly and/or processing installation, is achieved, wherein the carrier elements by means of in each case one coupling mechanism for a movement along a conveying section are coupled to a first drive device, and wherein by means of a switching mechanism the coupling mechanism of the carrier elements are decoupled from the first drive device and for a movement along the conveying section are coupled to a second drive devices. The carrier elements are conveyed along a conveying section that is defined upfront, wherein a departure from the conveying section is preferably not required for any processing step. In one design embodiment, the carrier elements per se serve as a coupling mechanism, as has been described.

BRIEF DESCRIPTION OF THE FIGURES

Further advantages and aspects of the invention are derived from the claims and from the description hereunder of preferred exemplary embodiments of the invention, said exemplary embodiments being explained hereunder by means of the figures in which

DETAILED DESCRIPTION OF THE EXEMPLARY EMBODIMENTS

Figure 1:
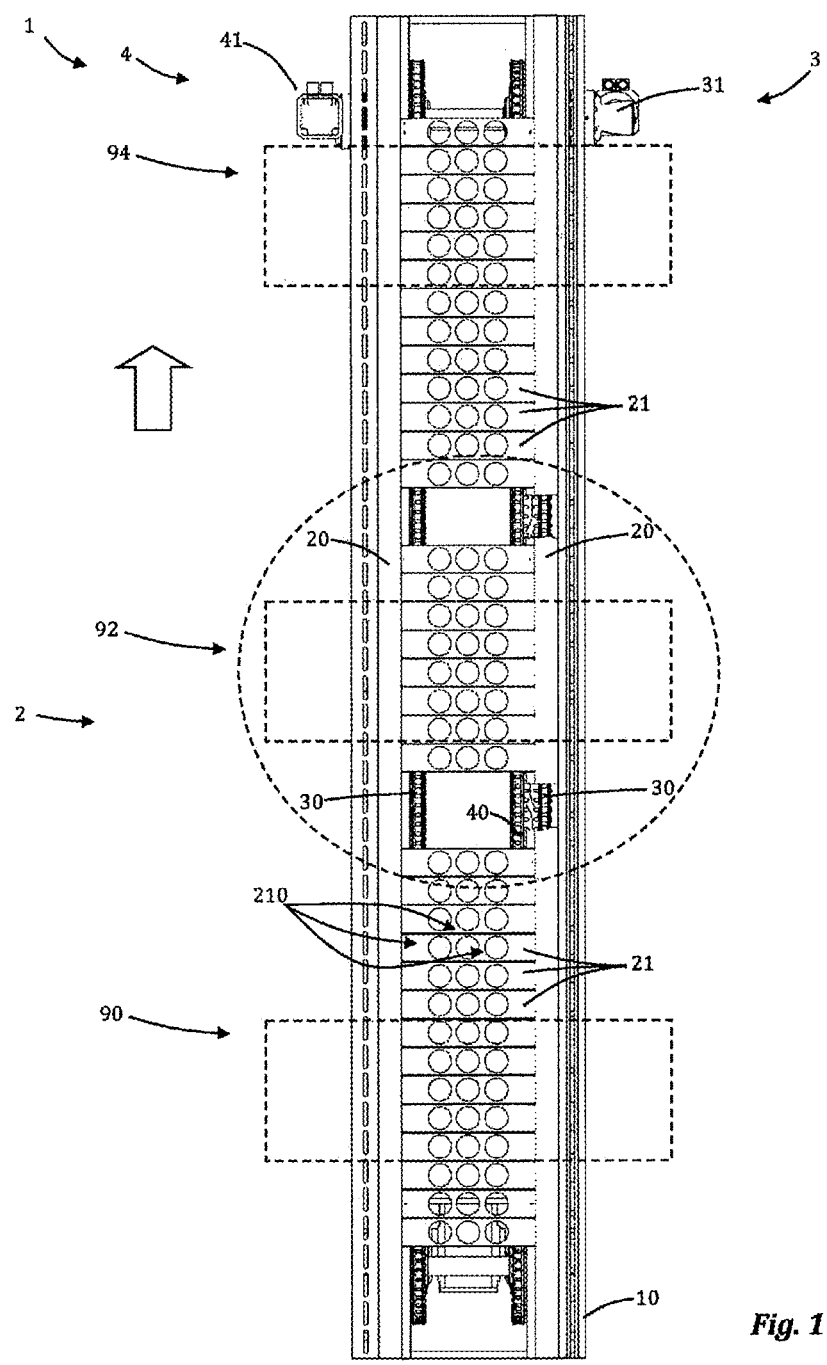
FIG. 1 shows a plan view of an exemplary embodiment of a transportation system.
Figure 2:
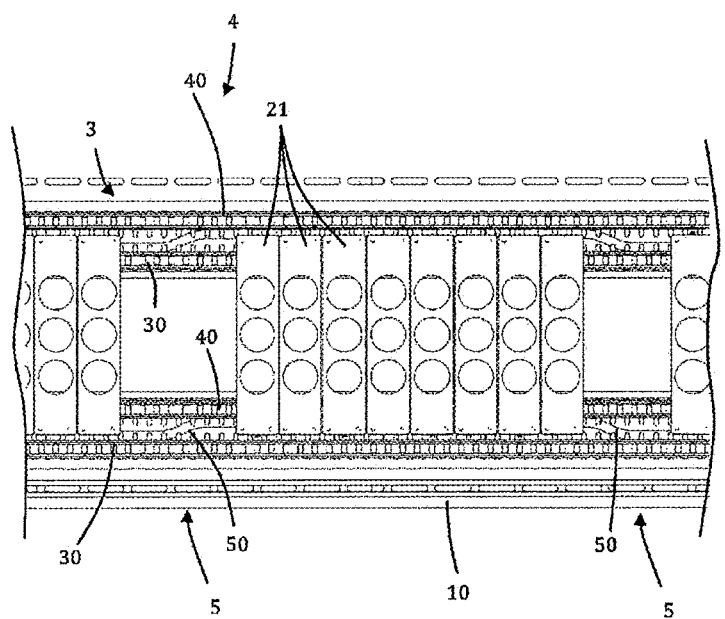
FIG. 2 shows a detail II according to FIG. 1.

FIG. 1 shows a plan view of an exemplary embodiment of a transportation system 1 for an installation comprising stations 90, 92, 94. FIG. 2 shows a detail II of the transportation system 1 according to FIG. 1 in an enlarged illustration.

The transportation system 1 comprises a carrier system 2 having a conveying section that in the exemplary embodiment illustrated is formed by two parallel guide rails 20, and a multiplicity of carrier elements 21 which along the guide rails 20 are guided so as to displaceable in a transportation direction that is indicated by an arrow. In other design embodiments, only one guide rail 20 or no guide rails at all are provided, wherein the conveying section is designed by alternative elements. The guide rails 20 are not illustrated in FIG. 2 for improved clarity.

The carrier elements 21 illustrated have in each case three clearances into which containers (not illustrated) for transportation in a packaging or filling installation can be inserted, for example. The containers are thus capable of being fed in an orderly manner in a plurality of rows, in rows of three in the exemplary embodiment, to individual stations 90, 92, 94 (indicated by dashed lines in FIG. 1) of the installation. The number and the shape of the clearances and/or of other components for receiving items to be processed are selectable in a suitable manner, depending on the application, by a person skilled in the art. It is also conceivable herein for items to be merely placed onto the carrier elements in an assembly line, without holding means being provided between the items and the carrier elements 21. However, at least positioning aids which enable an exact and repeatable positioning of the items on the carrier elements 21 are preferably provided.

The stations 90, 92, 94 are, for example, a container cleaning station 90, a filling station 92, and unloading station 94. However, other stations, additional stations, or fewer stations are also conceivable, depending on the design of an installation. Various operating modes are advantageous for passing the stations in an optimal manner. The carrier elements 21 thus preferably pass the container cleaning station 90 by way of a cycled movement, wherein the carrier elements 21 are fed to the station 90, are stopped and cleaned therein, and are subsequently discharged again from the station. By contrast, filling is preferably performed in a continuous movement of the carrier elements 21.

The transportation system 1 illustrated for this purpose comprises a first drive device 3 and a second drive device 4 that is disposed so as to be parallel with the first drive device 3. Even further drive devices are provided in other exemplary embodiments. The drive devices 3, 4 in the exemplary embodiment illustrated are in each case chain drives, wherein drive device 3 comprises two drive chains 30, and drive device 4 comprises two drive chains 40, that are guided so as to be mutually parallel. The two drive chains 30 of drive device 3 and the two drive chains 40 of drive device 4 in the exemplary embodiment illustrated are in each case coupled to one another mechanically by way of a coupling rod and are in each case driven by an assigned drive motor 31, 41. However, other design embodiments are also conceivable, wherein the drive chains 30, 40 are driven by means of a common drive.

The carrier elements 2 for a movement along the guide rails 20 are capable of being coupled to the first or to the second drive device 3, 4. Both drive devices 3, 4 in the exemplary embodiment illustrated extend across the entire length of the conveying section and are in principle suitable for transporting coupled carrier elements 21 across the entire conveying section by way of the drive device 3, 4.

The two drive devices 3, 4 are capable of being operated in different operating modes. It is provided in the exemplary embodiment illustrated that intermittent advancing of the carrier elements 21 is performed by means of the first drive device 3, and continuous advancing of the carrier elements 21 is performed by means of the second drive device 4. Of course, another choice in terms of the respective operating mode is however also conceivable.

The first drive device 3 for intermittent advancing preferably comprises a stepping gear (not illustrated) which is disposed between the drive motor 31 and the two drive chains 30 of the first drive device 3 and by means of which a continuous movement of the drive motor 31 is convertible to an intermittent movement of the drive chains 30. For example, a servomotor which drives the two drive chains 40 of the second drive device that are guided so as to be mutually parallel is provided as the drive motor 41 of the second drive device 4 for the continuous operating mode of the second drive device.

Two drive motors 31, 41 which are disposed on opposite sides of a support frame 10 of the transportation system 1 are provided in the exemplary embodiment illustrated.

However, other arrangements are also conceivable. The two drive motors 31, 41 are synchronized with one another, wherein a superordinate regulator installation (not illustrated) is provided for this purpose, for example, or the drive motors 31, 41 are operated in a master/slave mode. Alternatively, it is also conceivable for a common drive motor to be provided for both drive devices 3, 4, wherein different operating modes of the drive devices are capable of being realized by means of suitable gear elements.

Coupling device (not visible in FIGS. 1 and 2) are provided in each case on the carrier elements 21, by means of which the carrier elements 21 for a movement along the conveying section are capable of being coupled to the first or to the second drive device 3, 4.

The transportation system 1 for changing the drive device 3, 4 and thus for changing the drive mode of the carrier elements 21, furthermore comprises at least one switching mechanism 5, two switching mechanisms 5 for two changes of the drive mode are provided in the exemplary embodiment illustrated. The switching mechanisms 5 are disposed at suitable positions along the conveying section, whereby an adaptation to various requirements of the installation is possible by choosing the position of and the number of switching mechanisms.

The switching mechanisms 5 illustrated comprise in each case baffles 50 by means of which an actuation of the coupling mechanisms for decoupling the carrier elements 21 from a drive device 3, 4 and for coupling to the respective other drive device is triggered.

Figure 3:
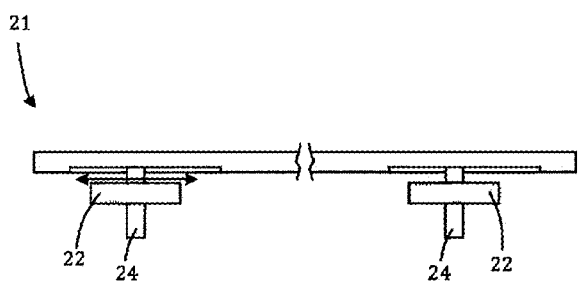
FIG. 3 shows a schematic sectional illustration of a carrier element having a coupling block that is attached so as to be displaceable transversely to the conveying section.

FIG. 3 schematically shows a side view of a design embodiment of the carrier element 21 on which laterally in each case as a coupling mechanism a coupling block 22 that is displaceable transversely to the transportation direction, as is indicated by an arrow, is provided on a lower side. On account of an adjustment movement of the coupling block 22, the latter is capable of being selectively coupled to one of the drive devices and of being decoupled from the respective other drive device. The coupling blocks 22 in the exemplary embodiment illustrated have in each case sliding blocks 24 which for an adjustment movement of the coupling blocks 22 interact with the baffles 50 illustrated in FIG. 2. To this end, the baffles 50 are designed as gates, wherein the sliding blocks 24 are preferably guided through the gates only in portions. Suitable provisions for threading the sliding blocks 24 into the gates in order for canting of the sliding blocks 24 to be prevented are made herein. The coupling blocks 22 of one drive block are in each case adjusted in a separate manner in the exemplary embodiment illustrated. In other design embodiments, the coupling blocks 22 for a transmission of the adjustment movement are coupled by means of a connection rod.

The baffles 50 are preferably designed in such a manner that a complete separation of the coupling mechanisms from a drive device 3, 4 is initially performed, and the coupling mechanisms are coupled to another drive device 4, 3 only upon the complete separation. Consequently, the carrier elements 22 during a change of the drive device 3, 4 in a transition region do not interact with any drive device 3, 4. Transportation of the carrier elements 21 along the conveying section in this transition region is performed in a passive manner by means of successive carrier elements 21. It is ensured on account of the transition region that a coupling to more than one drive device is not performed at any point in time.

In another design embodiment the carrier elements 21 by means of the baffles 50 are relocated transversely to the conveying section, wherein lateral guide rails 20 are dispensed with in this case, or the guide rails 20 are disposed in such a manner that the carrier elements 21 in each position are in each case laterally guided on one side.

The invention claimed is:

1. A transportation system for an installation, in particular a production, packaging, filling, assembly and/or processing installation, comprising:
    a carrier system having a conveying section and having a multiplicity of carrier elements;
    a first drive device,
    at least one second drive device and at least one switching mechanism that is positioned on the conveying section,
    wherein the first drive device and the at least one second drive device are in each case capable of being operated at a variable conveying speed that is established so as to be specific to the application,
    wherein the first and the at least one second drive device are operated in an electronically and/or mechanically synchronized manner by way of dissimilar operating modes selected from the group comprising continuous transportation, single-index transportation, double-index transportation, and multiple-index transportation,
    wherein the carrier elements have in each case one coupling mechanism by means of which the carrier elements for a movement along the conveying section are capable of being coupled to the first drive device and to the at least one second drive device, and
    wherein by means of the at least one switching mechanism the coupling mechanisms of the carrier elements for a movement along the conveying section are selectively coupled to one of the drive devices.

2. The transportation system as claimed in claim 1, wherein the first drive device extends at least across one first portion of the conveying section, and the second drive device extends at least across one second portion of the conveying section, wherein the first portion and the second portion are mutually overlapping.

3. The transportation system as claimed in claim 1, wherein the first and the at least one second drive device are designed as a gear rack drive, chain drive, belt drive, rake drive, worm drive, and/or linear motor drive, wherein the first and the at least one second drive device are preferably of an identical construction mode.

4. The transportation system as claimed in claim 1, wherein the carrier elements function as a coupling mechanism and/or have in each case one coupling mechanism that is rigidly disposed on the carrier element, wherein the carrier elements by means of the switching mechanism are relocatable transversely to the conveying section in order for the drive device to be changed.

5. The transportation system as claimed in claim 1, wherein the coupling mechanism of a carrier element comprises at least one adjustable coupling block which by means of the at least one switching mechanism for a movement along the conveying section is capable of being coupled to at least one of the drive devices and is capable of being decoupled from the at least one further drive device.

6. The transportation system as claimed in claim 4, wherein the switching mechanism has at least one baffle that is disposed on the conveying section, wherein the carrier element and/or the coupling block by means of the baffle are/is adjustable, in particular displaceable, from a first position in which said carrier element and/or said coupling block interact/s with the first drive device to a second position in which said carrier element and/or coupling block interact/s with a second drive device.

7. The transportation system as claimed in claim 1, wherein the carrier elements during a change of the drive device in a transition region do not interact with any drive device, wherein the carrier elements by means of successive carrier elements are movable in a passive manner along the conveying section.

8. The transportation system as claimed in claim 1, wherein the conveying section comprises at least one guide rail on which the carrier elements are guided in a passive manner, or by means of one of the drive devices are guided in a displaceable manner.

9. An installation, in particular a production, packaging, filling, assembly and/or processing installation, comprising a transportation system as claimed in claim 1.

10. A method for transporting carrier elements in an installation, in particular a production, packaging, filling, assembly and/or processing installation, wherein the carrier elements by means of in each case one coupling mechanism for a movement along a conveying section are selectively coupled to a first drive device or at least one second drive device, wherein the first drive device and the at least one second drive device are in each case are operated at a variable conveying speed that established so as to be specific to the application, wherein the first and the at least one second drive device are operated in an electronically and/or mechanically synchronized manner by way of dissimilar operating modes selected from the group comprising continuous transportation, single-index transportation, double-index transportation, and multiple-index transportation, wherein the carrier elements are coupled to the first drive device for a movement along the conveying section in a first operating modus, and by means of a switching mechanism the coupling mechanisms of the carrier elements are decoupled from the first drive device and for a movement along the conveying section in a second operating modus are coupled to the at least one second drive device.

\* \* \* \* \*